United States Patent
Li et al.

(10) Patent No.: US 11,042,408 B2
(45) Date of Patent: Jun. 22, 2021

(54) DEVICE, SYSTEM, AND RESOURCE ALLOCATION METHOD

(71) Applicant: Huawei Technologies Co., Ltd., Guangdong (CN)

(72) Inventors: Yingtao Li, Beijing (CN); Yi Wang, Shenzhen (CN); Dong Lin, Shenzhen (CN); Gong Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 104 days.

(21) Appl. No.: 16/259,782

(22) Filed: Jan. 28, 2019

(65) Prior Publication Data

US 2019/0155653 A1   May 23, 2019

Related U.S. Application Data

(63) Continuation of application No. PCT/CN2017/093911, filed on Jul. 21, 2017.

(30) Foreign Application Priority Data

Jul. 29, 2016   (CN) .......................... 201610613575.X

(51) Int. Cl.
*G06F 9/46* (2006.01)
*G06F 9/50* (2006.01)
(Continued)

(52) U.S. Cl.
CPC .......... *G06F 9/5011* (2013.01); *G06F 9/5077* (2013.01); *H04L 41/0896* (2013.01);
(Continued)

(58) Field of Classification Search
CPC .. G06F 9/5011; G06F 9/5077; H04L 41/0896; H04L 41/5051; H04L 47/24; H04L 67/42
(Continued)

(56) References Cited

U.S. PATENT DOCUMENTS 8,000,233 B2 *   8/2011   Anderson ............. H04L 47/783
                                                              370/230
9,215,179 B2 *  12/2015   Park ..................... H04L 47/2491
(Continued)

FOREIGN PATENT DOCUMENTS

CN   103338163 A   10/2013
CN   103650614 A    3/2014
(Continued)

OTHER PUBLICATIONS

Wu et al., "Application-Driven Network Resource Scheduling Scheme for Real-time Multimedia in Optical Grid", 2009, in Computer Science 2009 Fourth International Conference on Communications and Networking in China, 5 pages. (Year: 2009).*
(Continued)

*Primary Examiner* — Ted T. Vo
(74) *Attorney, Agent, or Firm* — Kilpatrick Townsend & Stockton LLP

(57) ABSTRACT

This application proposes a method, which includes: determining resource configuration information of a first application based on a first request sent by a client and global resource information of the ADN, where the first request includes information used to determine a resource requirement of the first application, the resource configuration information of the first application includes resource configuration of the first application in at least one subdomain in the ADN, and the global resource information includes resource utilization information of the first application in each subdomain and available resource information in each subdomain; and sending the resource configuration information of the first application to the client, where the resource configuration information of the first application is used by the client to request a C plane controller of the at least one subdomain to configure a resource of the first
(Continued)

application in a subdomain to which the C plane controller belongs.

9 Claims, 7 Drawing Sheets

(51) Int. Cl.
*H04L 12/24* (2006.01)
*H04L 12/851* (2013.01)
*H04L 29/06* (2006.01)

(52) U.S. Cl.
CPC .......... *H04L 41/5051* (2013.01); *H04L 47/24* (2013.01); *H04L 67/42* (2013.01)

(58) Field of Classification Search
USPC ........................................................ 718/104
See application file for complete search history.

(56) References Cited

U.S. PATENT DOCUMENTS

| | | | |
|---|---|---|---|
| 9,554,303 B1* | 1/2017 | Hitt | H04W 8/20 |
| 2012/0054346 A1 | 3/2012 | Lee et al. | |
| 2015/0180769 A1 | 6/2015 | Wang et al. | |
| 2015/0304281 A1 | 10/2015 | Kasturi et al. | |
| 2015/0341377 A1 | 11/2015 | Kasturi et al. | |
| 2016/0029403 A1* | 1/2016 | Roy | H04W 28/0278 370/336 |
| 2016/0081081 A1 | 3/2016 | Xu et al. | |

FOREIGN PATENT DOCUMENTS

| | | |
|---|---|---|
| CN | 104009871 A | 8/2014 |
| CN | 104244426 A | 12/2014 |
| CN | 104780232 A | 7/2015 |
| CN | 105357024 A | 2/2016 |

OTHER PUBLICATIONS

Huang et al., "Software-Defined Wireless Mesh Networks: Architecture and Traffic Orchestration", 2015, IEEE, pp. 24-30. (Year: 2015).*
Capelle et al., "Online Virtual Links Resource Allocation in Software-Defined Networks", 2015, IFIP Networking Conference, 9 pages. (Year: 2015).*
Ma et al., "On Path Selection for Traffic with Bandwidth Guarantees", Proceedings 1997 International Conference on Network Protocols, Oct. 1997, 12 pages.
Zhang et al., "RSVP: a new resource ReSerVation Protocol", IEEE Network, vol. 7, No. 5, Sep. 1993, pp. 8-18.
ICN Working Group, "Network Slicing and End-to-end ICN Service Orchestration with Mobility for 5G Networks," IMT-I-136, Focus Group on IMT-2020, International Telecommunication Union, Seoul, Mar. 8-11, 2016, 6 pages, XP44242044.
Tegueu, Francklin Simo, et al, "Towards Application Driven Networking," 2016 IEEE International Symposium on Local and Metropolitan Area Networks (Lanman), IEEE, Jun. 2016, 6 pages, XP032949125.
ETSI GS NFV—Man 001 V1.1.1 (Dec. 2014), "Network Functions Virtualisation (NFV); Management and Orchestration," Dec. 2014, 184 pages, XP14235740.
Layge:"When 5G meets AND", MSCBSC Mobile Communication Forum, Communication Industry Information, Dec. 24, 2015. total 4 pages.

* cited by examiner

| Version number | ADN number | Subdomain number | Serial number | Resource type quantity | <Resource category: requirement> | Operation type |

DEVICE, SYSTEM, AND RESOURCE ALLOCATION METHOD

CROSS-REFERENCE TO RELATED APPLICATIONS

This application is a continuation of International Application No. PCT/CN2017/093911, filed on Jul. 21, 2017, which claims priority to Chinese Patent Application No. 201610613575.X, filed on Jul. 29, 2016, the disclosures of the aforementioned applications are hereby incorporated by reference in their entireties.

TECHNICAL FIELD

This application relates to a computer network, and more specifically, to a device, a system, and a resource allocation method.

BACKGROUND

Software-defined networking (Software Defined Network, SDN) collects link information in a centralized manner on a control plane, generates a forwarding rule through calculation, and then downloads the forwarding rule to a data plane by using a southbound interface opened by an SDN network device, so that a forwarding behavior of a packet in the SDN network can be flexibly controlled by using software.

In the SDN network, global control is used to configure and manage administered resources in a centralized manner. This improves resource usage of a network device. However, the SDN network cannot provide a differentiated service for an application.

SUMMARY

This application provides a device, a system, and a resource allocation method of Application Driven Networking, so as to configure different resources for different applications based on resource requirements of applications, thereby providing differentiated services for the applications.

According to a first aspect, a resource allocation method is proposed. The method is applied to an S plane device in ADN. The ADN includes S plane device, a C plane device, and a D plane device, the D plane device is configured to transmit and forward data in the ADN, each C plane device is configured to control and manage at least one D plane device, the at least one D plane device controlled and managed by the C plane device forms one subdomain, the S plane device is configured to monitor and configure a resource of an application in each subdomain in the ADN, and the method includes:

determining resource configuration information of a first application based on a first request sent by a client and global resource information of the ADN, where the first request includes information used to determine a resource requirement of the first application, the resource configuration information of the first application includes resource configuration of the first application in at least one subdomain in the ADN, and the global resource information includes resource utilization information of the first application in each subdomain and available resource information in each subdomain; and sending the resource configuration information of the first application to the client, where the resource configuration information of the first application is used by the client to request a C plane controller of the at least one subdomain to configure a resource of the first application in a subdomain to which the C plane controller belongs.

With reference to the first aspect, in a first possible implementation, the method further includes: receiving resource utilization information sent by a C plane device of each subdomain of the ADN, where resource utilization information sent by a C plane device of a first subdomain is used to represent resource utilization information of each application in the first subdomain; and obtaining the global resource information of the ADN based on the resource utilization information sent by the C plane device of each subdomain of the ADN.

With reference to the first aspect and the foregoing implementation of the first aspect, in a second possible implementation of the first aspect, specific implementation is that the first request includes at least one of the following information: a quality of service QoS requirement of the first application, a history traffic feature of the first application, or an application behavior feature of the first application.

With reference to the first aspect and the foregoing implementations of the first aspect, in a third possible implementation of the first aspect, specific implementation is that specific implementation of the sending the resource configuration information of the first application to the client is sending, to the client, a VP corresponding to each subdomain of the at least one subdomain, where each VP carries resource configuration of the first application in a subdomain corresponding to the VP.

With reference to the first aspect and the foregoing implementations of the first aspect, in a fourth possible implementation of the first aspect, specific implementation is that the VP includes: an ADN identifier, used to represent an identifier of the first application in the ADN; a subdomain identifier, used to represent an identifier of a subdomain for which the VP needs to be configured; a serial number, used to distinguish between a plurality of times of different resource requirements of a same application; and resource category information, used to represent at least one resource category of the first application in the VP and a resource value corresponding to the at least one resource category.

With reference to the first aspect and the foregoing implementations of the first aspect, in a fifth possible implementation of the first aspect, specific implementation is that a field that is in the VP and that is used to store the resource category information has a variable length.

With reference to the first aspect and the foregoing implementations of the first aspect, in a sixth possible implementation of the first aspect, specific implementation is that the VP includes one or more fields used to store the resource category information of the VP.

With reference to the first aspect and the foregoing implementations of the first aspect, in a seventh possible implementation of the first aspect, specific implementation is that the VP further includes a version number, used to represent a version of a packet format used by the VP.

With reference to the first aspect and the foregoing implementations of the first aspect, in an eighth possible implementation of the first aspect, specific implementation is that the client is a device that measures a behavior of the first application, or the client is a device that runs the first application.

According to a second aspect, an S plane device is proposed and is configured to perform the method in any one of the first aspect or the possible implementations of the first aspect.

Specifically, the apparatus may include units configured to perform the method in any one of the first aspect or the possible implementations of the first aspect.

According to a third aspect, another S plane device is proposed and includes a processor and a channel interface, where the processor is configured to perform the method in any one of the first aspect or the possible implementations of the first aspect by using the channel interface.

According to a fourth aspect, a computer readable storage medium is proposed and is configured to store a computer program, and the computer program includes an instruction used to perform the method in any one of the first aspect or the possible implementations of the first aspect.

According to a fifth aspect, a resource allocation method is proposed. The method is applied to a client in the Application Driven Networking ADN, the ADN includes an S plane device, a C plane device, and a D plane device, the D plane device is configured to transmit and forward data in the ADN, each C plane device is configured to control and manage at least one D plane device, the at least one D plane device controlled and managed by the C plane device forms one subdomain, the S plane device is configured to monitor and configure a resource of an application in each subdomain in the ADN, and the method includes: sending a first request to the S plane device in the ADN, where the first request includes information used to determine a resource requirement of the first application, and the first request is used to request the S plane to configure a resource of the first application in each subdomain in the ADN; receiving resource configuration information sent by the S plane device, where the resource configuration information includes resource configuration of the first application in at least one subdomain in the ADN; and requesting, based on the resource configuration information, a C plane controller of the at least one subdomain to configure a resource of the first application in the at least one subdomain.

With reference to the fifth aspect, in a first possible implementation, specific implementation of the requesting, based on the resource configuration information, a C plane controller of the at least one subdomain to configure a resource of the first application in the at least one subdomain is sending, by using the D plane device in the ADN, a VP corresponding to a first subdomain, where the VP corresponding to the first subdomain is used by a C plane controller of the first subdomain to configure a resource of the first application in the first subdomain, the VP packet can be forwarded to the C plane controller of the first subdomain when a D plane device of the first subdomain receives the VP, and the first subdomain is any subdomain in the at least one subdomain.

According to a sixth aspect, a client is proposed and is configured to perform the method in any one of the fifth aspect or the possible implementation of the fifth aspect.

Specifically, the apparatus may include units configured to perform the method in any one of the fifth aspect or the possible implementation of the fifth aspect.

According to a seventh aspect, another client is proposed and includes a processor and a channel interface, where the processor is configured to perform the method in any one of the fifth aspect or the possible implementation of the fifth aspect by using the channel interface.

According to an eighth aspect, a computer readable storage medium is proposed and is configured to store a computer program, and the computer program includes an instruction used to perform the method in any one of the fifth aspect or the possible implementation of the fifth aspect.

According to a ninth aspect, a resource allocation method is proposed. The method is applied to a D plane device in ADN, the ADN includes an S plane device, a C plane device, and the D plane device, the D plane device is configured to transmit and forward data in the ADN, each C plane device is configured to control and manage at least one D plane device, the at least one D plane device controlled and managed by the C plane device forms one subdomain, the S plane device is configured to monitor and configure a resource of an application in each subdomain in the ADN, and the method includes; receiving resource configuration information of a first application, where the resource configuration information carries an identifier of a subdomain and resource configuration of the first application in the subdomain; and if it is determined, based on the identifier of the subdomain, that the subdomain is a subdomain in which the D plane device is located, sending the resource configuration to a C plane device of the subdomain, where the C plane controller is configured to control and manage a resource of each application in a subdomain to which the C plane controller belongs.

With reference to the ninth aspect, in a first possible implementation, the method further includes: if it is determined, based on the identifier of the subdomain, that the subdomain is not the subdomain in which the plane device is located, forwarding the resource configuration information of the first application.

With reference to the ninth aspect and the foregoing implementation of the ninth aspect, in a second possible implementation of the ninth aspect, the resource configuration information is a VP.

According to a tenth aspect, a D plane device is proposed and is configured to perform the method in any one of the ninth aspect or the possible implementations of the ninth aspect.

Specifically, the apparatus may include units configured to perform the method in any-one of the ninth aspect or the possible implementations of the ninth aspect.

According to an eleventh aspect, another D plane device is proposed and includes a processor and a channel interface, where the processor is configured to perform the method in any one of the ninth aspect or the possible implementations of the ninth aspect by using the channel interface.

According to a twelfth aspect, a computer readable sage medium is proposed and is configured to store a computer program, and the computer program includes an instruction used to perform the method in any one of the ninth aspect or the possible implementations of the ninth aspect.

According to a thirteenth aspect, a resource allocation method is proposed. The method is applied to a C plane device in ADN, the ADN includes an S plane device, the C plane device, and a D plane device, the D plane device is configured to transmit and forward data in the ADN, each C plane device is configured to control and manage at least one D plane device, the at least one D plane device controlled and managed by the C plane device forms one subdomain, the S plane device is configured to monitor and configure a resource of an application in each subdomain in the ADN, and the method includes: receiving first resource configuration information that is of a first application and that is forwarded by a D plane device of a first subdomain in which the C plane device is located, where the first resource configuration information carries resource configuration of the first application in the first subdomain; and configuring a resource of the first application in the first subdomain based on the first resource configuration information.

With reference to the thirteenth aspect, in a first possible implementation, the method further includes: obtaining resource utilization information of each D plane device in the first subdomain, where the resource utilization information of each D plane device includes resource utilization information of an application; and sending resource utilization information of each application in the first subdomain to the S plane device of the ADN.

With reference to the thirteenth aspect and the foregoing implementation of the thirteenth aspect, in a second possible implementation of the thirteenth aspect, the method further includes: obtaining resource configuration of an application of a second subdomain to which a second C plane device belongs; and specific implementation of the configuring a resource of the first application in the first subdomain based on the first resource configuration information is determining, based on the resource configuration of the first application in the first subdomain and resource configuration of the first application in the second subdomain, communication paths of the first application in the first subdomain and the second subdomain, and configuring the resource of the first application in the first subdomain based on the communication paths of the first application in the first subdomain and the second subdomain.

With reference to the thirteenth aspect and the foregoing implementations of the thirteenth aspect, in a third possible implementation of the thirteenth aspect, the method further includes: receiving second resource configuration information that is of the first application and that is forwarded by the D plane device of the first subdomain in which the C plane device is located, where the second resource configuration information carries the resource configuration of the first application in the first subdomain; and performing incremental configuration on the resource of the first application in the first subdomain based on the second resource configuration information.

With reference to the thirteenth aspect and the foregoing implementations of the thirteenth aspect, in a fourth possible implementation of the thirteenth aspect, the first resource configuration information is a VP.

According to a fourteenth aspect, a C plane device is proposed and is configured to perform the method in any one of the thirteenth aspect or the possible implementations of the thirteenth aspect.

Specifically, the apparatus may include units configured to perform the method in any one of the thirteenth aspect or the possible implementations of the thirteenth aspect.

According to a fifteenth aspect, another C plane device is proposed and includes a processor and a channel interface, where the processor is configured to perform the method in any one of the thirteenth aspect or the possible implementations of the thirteenth aspect by using the channel interface.

According to a sixteenth aspect, a computer readable storage medium is proposed and is configured to store a computer program, and the computer program includes an instruction used to perform the method in any one of the thirteenth aspect or the possible implementations of the thirteenth aspect.

According to a seventeenth aspect, an ADN system is proposed. The system includes the S plane device in the second aspect and the foregoing implementation of the second aspect, the client in the sixth aspect and the foregoing implementation of the sixth aspect, the D plane device in the tenth aspect and the foregoing implementation of the tenth aspect, and the C plane device in the fourteenth aspect and the foregoing implementation of the fourteenth aspect, or includes the S plane device in the third aspect and the foregoing implementation of the third aspect, the client in the seventh aspect and the foregoing implementation of the seventh aspect, the D plane device in the eleventh aspect and the foregoing implementation of the eleventh aspect, and the C plane device in the fifteenth aspect and the foregoing implementation of the fifteenth aspect.

Based on the foregoing technical solutions, according to the device, the system, and the resource allocation method of Application Driven Networking in this application, a resource of an application is configured in at least one subdomain in the ADN based on a resource requirement of the application, so as to provide a differentiated service for the application based on the resource requirement of the application.

DESCRIPTION OF EMBODIMENTS

Figures 1, 2:
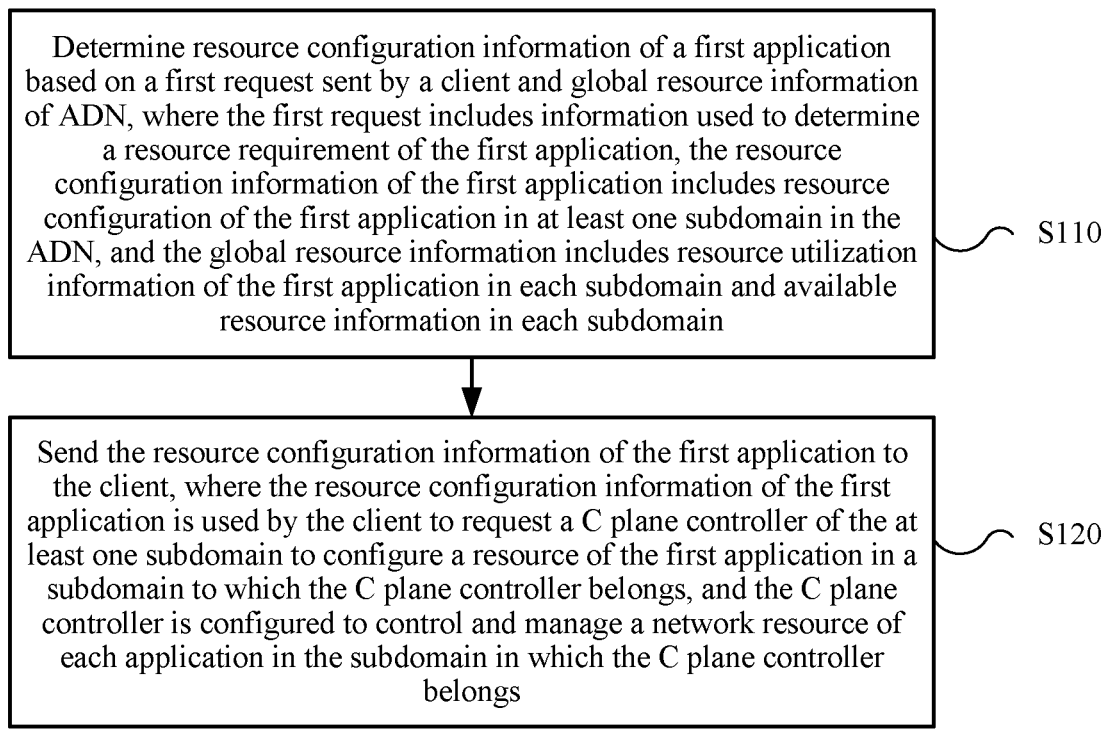
FIG. 1 is a flowchart of a resource configuration method of ADN according to an embodiment of this application.
FIG. 2 is a schematic diagram of a data format of a VP according to an embodiment of this application.

The following describes the technical solutions in this application with reference to the accompanying drawings.

The technical solutions in this application may be applied to various computer networks. The computer network may be a common computer network, a cloud computer network, a wireless computer network, or the like. The wireless computer network may include various communications systems, such as: a Global System for Mobile Communications (GSM), a Code Division Multiple Access (CDMA) system, a Wideband Code Division Multiple Access (WCDMA), a general packet radio service (General Packet Radio Service, GPRS), and Long Term Evolution (LTE).

User equipment (UE) may also be referred to as a mobile terminal, an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN).

A network device may be a device used in a local area network, a wide area network, and the like in the computer network, such as a gateway, a router, and a switch. The network device may also be a device configured to communicate with a mobile device. For example, the network device may be a base transceiver station (BTS) in GSM or CDMA, may be a NodeB (NodeB, NB) in WCDMA, or may be an eNB or evolved NodeB (eNodeB) in LTE, or an access point, an in-vehicle device, a wearable device, a network side device in a future 5G network, or a network device in a future evolved PLMN.

This application proposes Application Driven Networking (ADN), and proposes to establish a network for an application and provide a logically independent network for each application, so as to meet various requirements of each application for the network, improve application efficiency, and facilitate application usage, thereby improving user experience.

An ADN network may include network elements such as an S plane device, a C plane device, and a D plane device.

The D plane device is a network device configured to transmit data in the ADN network, and the D plane device provides independent resources for different applications, so as to implement an independent network scheduling policy, congestion control policy, queuing mechanism, and the like, thereby providing a differentiated service for the application.

The C plane device performs partial control on some network nodes or resources in the ADN network. A subnetwork that includes the D plane device that can be controlled by one C plane device in the ADN is referred to as a subdomain. The C plane device can configure a resource of an application in a subdomain to which the C plane device belongs, and report resource utilization information of the subdomain to the S plane device. Specifically, resource utilization information of an application in each subdomain may include a used resource and an available resource of each application, and the like.

The S plane device is configured to monitor global resource information of the ADN, and configure a resource of an application in each subdomain. The global resource information of the ADN may include resource utilization information of an application in each subdomain in the ADN.

FIG. 1 is a flowchart of a resource configuration method of ADN according to an embodiment of this application. The method in FIG. 1 is applied to an S plane device in the ADN and is performed by the S plane device. The ADN includes the S plane device, a C plane device, and a D plane device. The D plane device is configured to transmit and forward data in the ADN, each C plane device is configured to control and manage at least one D plane device, the at least one D plane device controlled and managed by the C plane device forms one subdomain, and the S plane device is configured to monitor and configure a resource of an application in each subdomain in the ADN. It should be understood that, in this application, the S plane device may be a network controller, configured to monitor and configure a global resource of an application in each subdomain in the ADN. The method in FIG. 1 may include the following steps.

S110. Determine resource configuration information of a first application based on a first request sent by a client and global resource information of the ADN, where the first request includes information used to determine a resource requirement of the first application, the resource configuration information of the first application includes resource configuration of the first application in at least one subdomain in the ADN, and the global resource information includes resource utilization information of the first application in each subdomain and available resource information in each subdomain.

It should be understood that, in this application, resource requirement information of the first application may be overall resource requirement information of the first application, or may be incremental requirement information of the first application. This is not limited in this application.

It should be understood that the resource requirement of the first application may include one or more types of resources, such as a computing resource, a network resource, and a storage resource.

It should be understood that, in this application, one subdomain is a network that includes a D plane device controlled by one C plane device, and the D plane device is a network device that is configured to transmit data in the ADN network. Data of the application is transmitted on the D plane device, and a resource of the D plane device is used.

It should be understood that the resource utilization information of the first application in each subdomain is a resource utilization status of the first application in each subdomain. Specifically, the resource utilization information may include information about a resource that is of the first application and that is used on each D plane device in each subdomain.

It should be understood that the available resource information in each subdomain may include an available resource of each D plane device in each subdomain.

It should be understood that the resource configuration information of the first application includes the resource configuration of the first application in at least one subdomain in the ADN, and the at least one subdomain may be all subdomains related to the resource requirement information in the subdomains in the ADN, or a subdomain in which the resource configuration of the first application changes in the subdomains in the ADN, or all subdomains related to the first application in the subdomains in the ADN.

It may be assumed that the ADN network includes three subdomains: a subdomain 1, a subdomain 2, and a subdomain 3. The S plane device determines to configure resources for the first application in the subdomain 1 and the subdomain 2. For example, it is assumed that networks of the subdomain 1 and the subdomain 2 need to pass through the subdomain 3. In this case, it is obvious that the S plane device needs to calculate resource configuration of the first application in the subdomain 1, the subdomain 2, and the subdomain 3. For another example, it is assumed that the subdomain 1 is connected to the subdomain 2, and the S plane device only needs to calculate resource configuration of the first application in the subdomain 1 and the subdomain 2. Certainly, the S plane device may also calculate the resource configuration of the first application in the subdomain 1, the subdomain 2, and the subdomain 3, but apparently, the resource configuration of the first application in the subdomain 3 is redundant.

It should be understood that, in this application, the client may be a terminal device that runs the first application, or a device that measures a behavior of the first application. Measuring the behavior of the first application may specifically include measuring the resource requirement, a behavior feature, history traffic, or the like of the first application. When the client is the terminal device that runs the first application, the client may directly obtain the resource requirement information of the first application. When the client is the device that measures the behavior of the first application, the client may obtain the resource requirement information of the first application on at least one terminal device through measurement. The resource requirement information of the first application includes at least one of the following: a quality of service QoS requirement, a history traffic feature, or an application behavior feature of the first application.

S120. Send the resource configuration information of the first application to the client, where the resource configuration information of the first application is used by the client to request a C plane controller of the at least one subdomain to configure a resource of the first application in a subdomain to which the C plane controller belongs.

It should be understood that, in this application, the S plane device may use a vertical packet (VP) to represent the resource configuration information of the first application. Specifically, step S120 may be implemented as follows: A vertical packet (VP) corresponding to each subdomain of the at least one subdomain is sent to the client, where each VP carries resource configuration of the first application in a subdomain corresponding to the VP.

It should be understood that a data format of a VP may include the following fields:

an ADN identifier, used to represent an identifier of the first application in the ADN;

a subdomain identifier, used to represent an identifier of a subdomain for which the VP needs to be configured;

a serial number, used to distinguish between a plurality of times of different resource requirements of a same application; and resource category information, used to represent at least one resource category of the first application in the VP and a resource value corresponding to the at least one resource category.

Optionally the data format of the VP may further include a version number of the VP, and a version number field is used to identify the version number of the vertical packet, so as to determine a data format used by the VP when the VP is parsed.

Optionally, the data format of the VP may further include an operation type of the VP, and the operation type of the VP may be used to represent an operation type of a resource in the VP, for example, may indicate whether the VP is used for reporting or configuration.

Optionally, the data format of the VP may further include an association relationship between resource categories, an association relationship between the resource categories and a resource type corresponding to another VP, and the like.

FIG. 2 is a schematic diagram of a data format of a VP according to an embodiment of this application. A meaning of the data format of the VP shown in FIG. 2 may be shown in Table 1.

TABLE 1

| | |
|---|---|
| Version number: | Version number of a vertical packet |
| ADN number: | Globally unique number allocated to each application |
| Subdomain number: | Globally unique number of a subdomain managed by each C plane device in ADN |
| Serial number: | Serial number of the vertical packet, used to distinguish between a plurality of times of different resource requirements of a same application, for example, a resource requirement generated because of resource adjustment, and a resource requirement generated because of joining of a plurality of clients |
| Resource type quantity: | Quantity of required resource types |
| <Resource category: requirement> | In one VP, there may be a plurality of <resource category: requirement>, and each <resource category: requirement> represents a requirement for one type of resource. Generally, three types of resources may be included: a computing resource, a network resource, and a storage resource. The three types of resources may be further divided, for example, the network resource may include QoS. |
| Operation type | Indicates whether a resource in the VP is used for reporting or configuration. For example, 0 is used to represent a current resource status and is used for reporting; and 1 is used to represent current resource configuration and is used for configuration. Further, the operation type may be used to identify an incremental report. For example, two bits are used for representation, the first bit is used for reporting or configuration, the second bit is used for indicating increment or overall, 0 represents overall, and 1 represents increment. In this way, 00 represents overall reporting, 11 represents incremental configuration, and the like. |

It should be understood that in the data format shown in Table 1, the version number field is used to identify the version number of the vertical packet, so as to determine a data format used by the VP when the VP is parsed.

It should be understood that the resource type quantity field is optional, and one VP can be parsed without the resource type quantity field.

The <resource category: requirement> of the data format of the VP in FIG. 2 or Table 1 may be named a resource category information field. The resource category information field has a variable length. In addition, one VP may include one or more resource category information fields.

In this application, the S plane device sends the resource configuration of the first application in each subdomain in the ADN to the client based on the resource requirement of the first application and the global resource information of the ADN network, so as to request, by using the client, the C plane device of each subdomain to perform network resource configuration for the first application, enable the ADN to provide a differentiated service for the application based on the resource requirement of the application, meet various requirements of each application for the network, improve application efficiency, and facilitate application usage, thereby improving user experience.

In addition, the S plane device instructs, by using the client, each subdomain to perform resource configuration for the first application, so as to avoid directly configuring the resource of the subdomain by using the C plane device, and implement decoupling between the S plane device and the C plane device of each subdomain, thereby facilitating function extension of the S plane device.

Optionally, before step S110, the method may further include: receiving resource utilization information sent by the C plane device of each subdomain of the ADN, where resource utilization information sent by a C plane device of a first subdomain is used to represent resource utilization information of each application in the first subdomain; and obtaining the global resource information of the ADN based on the resource utilization information sent by the C plane device of each subdomain of the ADN.

The following further describes the method in this application with reference to specific embodiments.

Figure 3:
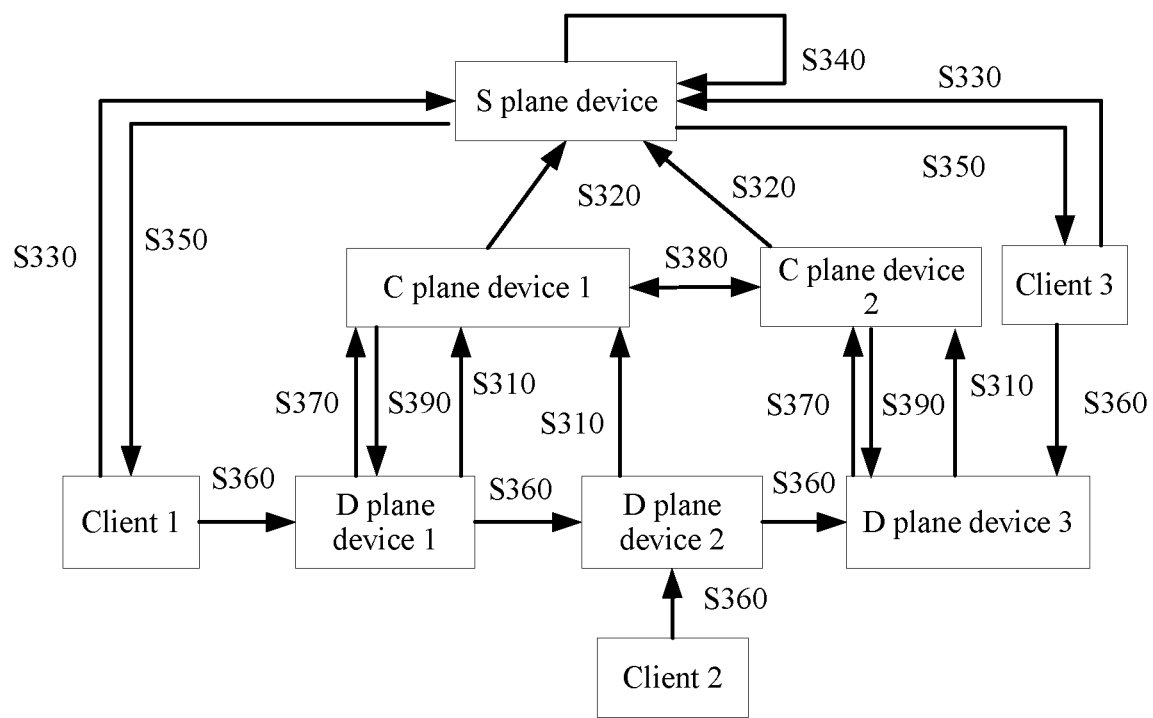
FIG. 3 is an interaction flowchart of resource configuration of ADN according to an embodiment of this application.

FIG. 3 is an interaction flowchart of resource configuration of ADN according to an embodiment of this application. In this application, an S plane device configures resources for an application in a plurality of control subdomains.

S310. A C plane device obtains resource utilization information of a D plane device in a subdomain.

It should be understood that the C plane device may obtain the resource utilization information of the D plane device in the subdomain when the S plane device requests to obtain resource utilization information of the subdomain, or receive the resource utilization information sent by the D plane device when a resource utilization status changes, or obtain the resource utilization information of the D plane device in the subdomain regularly, or the like.

When the C plane device actively obtains the resource utilization information of the D plane device in the subdomain, the C plane device may obtain the resource utilization status on the D plane device through measurement. In the embodiment shown in FIG. 3, a C plane device 1 may obtain resource utilization statuses of a D plane device 1 and a D plane device 2 through measurement, and a C plane device 2 may obtain a resource utilization status of a D plane device 3 through measurement. The resource utilization status on the D plane device may include resource utilization information of each application on the D plane device and available resource information of the D plane device.

S320. The C plane device sends, to the S plane device, resource utilization information in a subdomain to which the C plane device belongs.

After obtaining actual resource utilization information of D plane devices in the subdomain to which the C plane device belongs, the C plane device may obtain the resource utilization information of the subdomain through summarization. Specifically, the resource utilization information of the subdomain may include resource utilization information of each application in the subdomain and available resource information of the subdomain.

The resource utilization information of each application in the subdomain includes resource utilization information of an application on each D plane device in the subdomain.

The available resource information of the subdomain includes available resource information of each D plane device in the subdomain.

After obtaining the resource utilization status of the subdomain, the C plane device may report the resource utilization status of the subdomain to the S plane device. A data format of the report, for example, may be the data format of the VP shown in FIG. 2 and Table 1.

S330. A client sends a resource request to the S plane device.

It should be understood that, in this application, the client may be a terminal device that runs the application, or a third party device that measures a resource requirement or a behavior feature of the application and that is independent of the terminal device that runs the application. When the client is the terminal device that runs the application, the client may directly obtain the resource requirement of the application, or determines the resource requirement of the application based on the behavior feature, a history traffic feature, and the like of the application. When the client is the third party device that is independent of the terminal device that runs the application, by measuring a change such as traffic of the application, the client may obtain the resource requirement of the application, or information used to determine the resource requirement of the application, for example, a quality of service QoS requirement of the application, and the history traffic feature or the application behavior feature of the application.

Specifically, for example, a client 1 may send a first resource request to the S plane device, and the first resource request includes information used to determine a resource requirement of an application 1.

S340. The S plane device calculates resource configuration of the application in each subdomain.

It should be understood that, based on the resource utilization status of the subdomain that is reported by the C plane device, the S plane device may obtain global resource information of the entire ADN, including used resource information of each application in each subdomain and available resource information in each subdomain.

In addition, the S plane device may determine the resource requirement of the application based on the resource request, and further obtain through calculation, based on the global resource information of the ADN and the resource requirement of the application, a resource that should be allocated to the application by each subdomain.

For example, the S plane device may determine the resource request of the application 1 based on the first resource request sent by the client 1, and further determine resource configuration of the application 1 in a subdomain 1 and a subdomain 2 based on the resource request of the application 1 and the global resource information of the ADN.

S350. The S plane device sends the resource configuration of the application to the client.

After obtaining, through calculation, the resource that should be allocated to the application by each subdomain, the S plane device may generate the resource configuration of the application in each subdomain. It should be understood that, if the configuration of the application is not related to the subdomain, or the configuration of the application does not change in the subdomain, the S plane device may not perform configuration of the application in the subdomain.

A data format of the resource configuration of the application in each subdomain may be the data format of the VP, and one VP is used to represent resource configuration of the application in one subdomain. Certainly, it should be understood that the S plane device may send the resource configuration of the application in each subdomain in another data format.

After generating the resource configuration of the application, the S plane device may send the resource configuration of the application to the client.

Specifically, for example, after determining the resource configuration of the application 1 in the subdomain 1 and the subdomain 2, the S plane device may generate a VP 1 and a VP 2, which respectively represent the resource configuration of the application 1 in the subdomain 1 and the resource configuration of the application 1 the subdomain 2.

S360. The client sends the resource configuration of the application in each subdomain to the D plane device.

After receiving the resource configuration of the application that is sent by the S plane device, the client may request, based on the resource configuration of the application, a C plane device of a related subdomain to configure a resource for the application.

Specifically, for example, after receiving the VP 1 and the VP 2 sent by the S plane device, the client 1 may send the VP 1 amid the VP 2 to the D plane device 1. The VP 1 represents resource configuration of the application 1 in the subdomain 1 in which the C plane device 1 is located, and the VP 2 represents resource configuration of the application 1 in the subdomain 2 in which the C plane device 2 is located.

In addition, after receiving a VP, the D plane device may determine, based on a subdomain identifier in the VP, whether the VP belongs to subdomain to which the D plane device belongs. If the VP does not belong to the subdomain to which the D plane device belongs, step S370 is performed. If the VP belongs to the subdomain to which the D plane device belongs, the VP is forwarded to another D plane device.

For example, after receiving the VP 1 and the VP 2, the D plane device 1 may determine that the VP 1 belongs to the subdomain 1 in which the D plane device 1 is located, and forwards the VP 1 to the C plane device 1 of the subdomain 1. In addition, the D plane device 1 may determine that the VP 2 does not belong to the subdomain 1 in which the D plane device 1 is located, and forwards the VP 2 to the D plane device 2.

S370. The D plane device sends the resource configuration of the application in the subdomain to a C plane control device in a subdomain to which the D plane device belongs.

When determining that the received resource configuration of the application belongs to the subdomain to which the D plane device belongs, the plane device may send the received resource configuration of the application to the C plane device in the subdomain to which the D plane device belongs.

Specifically, for example, after receiving the VP 1, the D plane device 1 may forward the VP 1 to the C plane device 1 of the subdomain 1, and after receiving the VP 2, the D plane device 3 may forward the VP 2 to the C plane device 2 of the subdomain 2.

S380. The C plane device exchanges application information.

After receiving the resource configuration of the application, the C plane device may exchange the application information with a neighboring subdomain. Specifically, the application information is information about a resource ready to be configured for the application in the subdomain. The C plane device exchanges the application information with the neighboring subdomain to negotiate a connection channel of the application between two neighboring subdomains.

Specifically, for example, after receiving the VP 1 and the VP 2, the C plane device 1 and the C plane device 2 may exchange the configuration of the application in the subdomain 1 and the subdomain 2, so as to negotiate a connection channel between the subdomain 1 and the subdomain 2.

S390. The C plane device configures a resource of the application in the subdomain.

After completing exchanging of the application information, the C plane device may determine the connection channel between the subdomains based on the application, so as to configure the resource for the application. In this way, the resource configured for the application passes the connection channel between the subdomains.

It should be understood that, in actual application, in addition to the resource configuration of the application in the subdomain, resource request information of the application, the resource utilization information that is of the subdomain and that is sent to the S plane device by the C plane device, and the like may be transmitted by using the VP. Specifically, for example, one piece of indication information may be added to the data format of the VP shown in FIG. 2 and Table 1, and is used to indicate that the VP resource is a used resource of the application in the subdomain, an available resource of the application in the subdomain, a resource ready to be configured for the application in the subdomain, or the like. Alternatively, a resource category information field may be extended, for example, the resource type information field may include a requirement of each type of resource, an association relationship between this type of resource and this type of resource in another VP, and an association relationship between this type of resource and another type of resource in a same VP. The association relationship between this type of resource and this type of resource in another VP may be used to indicate that this type of resource is an available resource, a used resource, a resource ready to be configured, or the like.

Figure 4:
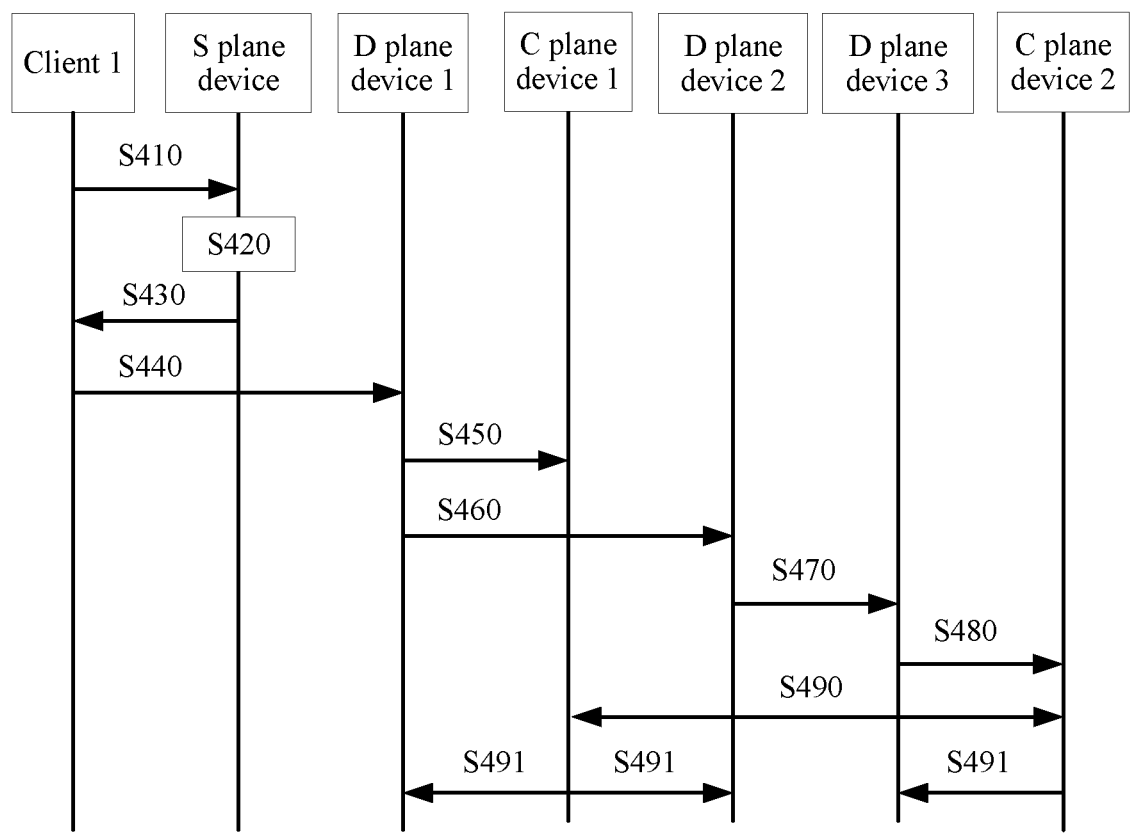
FIG. 4 is a specific flowchart of initiating a resource request by a client according to an embodiment of this application.

For ease of understanding a request procedure of the client, the following describes in detail the procedure with reference to FIG. 4.

FIG. 4 is a specific flowchart of initiating a resource request by the client 1 in FIG. 3. As shown in FIG. 4, the procedure includes the following steps.

S410. The client 1 sends a first request to an S plane device.

The client 1 that runs or monitors an application 1 may send the first request to the S plane device. The first request includes information used to determine a resource requirement of the first application, for example, a quality of service QoS requirement, a history traffic feature, or an application behavior feature of the first application. The first request is used to request the S plane to configure a resource of the application 1 in each subdomain in ADN.

S420. The S plane device calculates resource configuration of an application 1 in each subdomain.

The S plane device may determine a resource requirement of the application 1 based on the first request, and further obtain, through calculation based on global resource information of the ADN and the resource requirement of the application 1, the resource configuration of the application 1 in each subdomain, including resource configuration of the application 1 in a subdomain 1 and resource configuration of an application 2 in a subdomain 2.

S430. The S plane device sends resource configuration VP 1 and VP 2 of the application 1 to the client 1.

The S plane device generates the resource configuration VP 1 of the application 1 in the subdomain 1 based on the resource configuration of the application 1 in the subdomain 1, generates the resource configuration VP 2 of the application 1 in the subdomain 2 based on the resource configuration of the application 1 in the subdomain 2, and sends the VP 1 and the VP 2 to the client 1.

S440. The client 1 sends the VP 1 and the VP 2 to a D plane device 1.

S450. The D plane device 1 forwards the VP 1 to a C plane device 1.

The D plane device 1 of the subdomain 1 detects that a subdomain identifier of the VP 1 is the same as a subdomain identifier of the subdomain 1, and forwards the VP 1 to the C plane device 1.

S460. The D plane device 1 forwards the VP 2 to a D plane device 2.

The D plane device 1 of the subdomain 1 detects that a subdomain identifier of the VP 2 is different from the subdomain identifier of the subdomain 1, and forwards the VP 1 to the D plane device 2 of the subdomain 1.

S470. The D plane device 2 forwards the VP 2 to a D plane device 3.

The D plane device 2 of the subdomain 1 detects that the subdomain identifier of the VP 2 is different from the subdomain identifier of the subdomain 1, and forwards the VP 1 to the D plane device 3 of the subdomain 2.

S480. The D plane device 3 forwards the VP 1 to a C plane device 2.

The D plane device 3 of the subdomain 2 detects that the subdomain identifier of the VP 2 is the same as a subdomain identifier of the subdomain 2, and forwards the VP 2 to the C plane device 2 of the subdomain 2.

S490. The C plane device 1 exchanges information about the application 1 with the C plane device 2.

The C plane device 1 exchanges the information about the application 1 with the C plane device 2, so as to negotiate a connection channel between the subdomain 1 and the subdomain 2.

S491. The C plane device 1 configures a resource of the subdomain 1 based on the VP 1, and the C plane device 2 configures a resource of the subdomain 2 based on the VP 1.

After the C plane device 1 negotiates with the C plane device 2 to determine the connection channel between the subdomain 1 and the subdomain 2, the C plane device 1 and the C plane device 2 may separately configure the resources of the application 1 in the subdomain 1 and the subdomain 2 based on the connection channel between the subdomain 1 and the subdomain 2.

Figure 5:
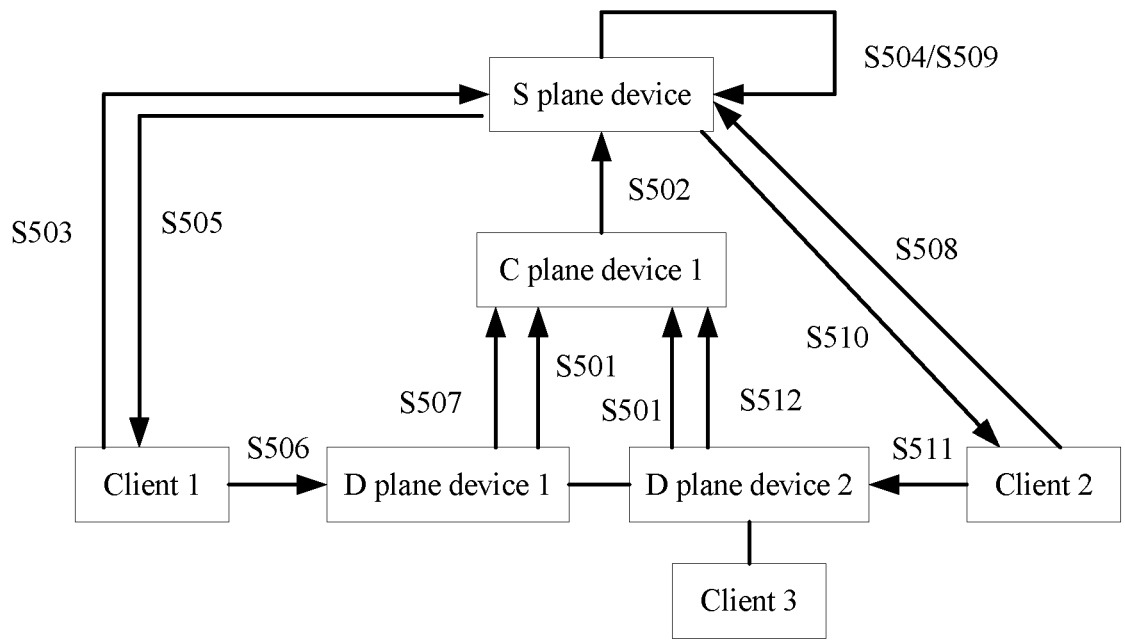
FIG. 5 is an interaction flowchart of resource configuration of ADN according to another embodiment of this application.

FIG. 5 is an interaction flowchart of resource configuration of ADN according to an embodiment of this application. In this application, one application has a plurality of client request resources in one control subdomain.

S501. A C plane device obtains resource utilization information of a D plane device.

Specifically, a C plane device 1 may obtain resource utilization information of a D plane device 1 and a D plane device 2.

S502. The C plane device sends, to an S plane device, resource utilization information in a subdomain to which the C plane device belongs.

Specifically, the C plane device 1 may send resource utilization formation of each application on the D plane device 1 and the D plane device 2, available resource information of the D plane device 1 and the D plane device 2, and the like to the S plane device, so that the S plane device can determine global resource information of an ADN network.

S503. A client sends a first resource request to the S plane device.

Specifically, a client 1 may send the first resource request to the S plane device. The first resource request includes information used to determine a resource requirement of an application 1, for example, a QoS requirement of the application 1, a history traffic feature of the application 1, or an application behavior feature of the application 1.

S504. The S plane device calculates resource configuration of an application in each subdomain.

The S plane device may determine the resource requirement of the application 1 based on the first resource request, and further obtain, through calculation based on the global resource information of the ADN and the resource requirement of the application 1, the resource configuration of the application 1 in each subdomain, including resource configuration of the application 1 in a subdomain 1 and resource configuration of an application 2 in a subdomain 2.

Specifically, the S plane device may determine the resource requirement of the application 1 based on the first resource request sent by the client 1 and the global resource information, so as to obtain, through calculation, a resource that should be allocated to the application 1 by the subdomain 1.

S505. The S plane device sends the resource configuration of the application to the client.

Specifically, the S plane device may send resource configuration information VP 1 of the application 1 in the subdomain 1 to the client 1.

S506. The client sends the resource configuration of the application in each subdomain to the D plane device.

Specifically, after receiving the VP 1 sent by the S plane device, the client 1 may send the VP 1 to the D plane device 1.

S507. The D plane device sends the resource configuration of the application in the subdomain to a C plane control device in a subdomain to which the D plane device belongs.

Specifically, after receiving the VP 1, the D plane device 1 may send the VP 1 to the C plane device 1, and the C plane device 1 may configure a resource of the application 1 in the subdomain 1 based on the VP 1.

For specific implementation of step S501 to step S507, refer to the related step S310 to step S370 in the embodiment shown in FIG. 3.

S508. The client sends resource requirement information of the application to the S plane device.

Similarly, a client 2 may send resource requirement information of the application 1 to the S plane device.

S509. The S plane device calculates the resource configuration of the application in each subdomain.

Similarly, the S plane device may obtain, through calculation based on the global resource information and the resource requirement of the application 1 that is sent by the client 2, the resource that should be allocated to the application 1 by the subdomain 1.

S510. The S plane device sends the resource configuration of the application to the client.

Similarly, the S plane device may send resource configuration information VP 2 of the application 1 in the subdomain 1 to the client 2.

S511. The client sends the resource configuration of the application in each subdomain to the D plane device.

Similarly, after receiving the VP 2 sent by the S plane device, the client 2 may send the VP 2 to the D plane device 2.

S512. The D plane device sends the resource configuration of the application in the subdomain to the C plane control device in the subdomain to which the D plane device belongs.

Specifically, after receiving the VP 2, the D plane device 2 may send the VP 2 to a C plane device 2, and the C plane device 2 may perform incremental configuration on the resource of the application 1 in the subdomain 1 based on the VP 2.

In this application, when resource configuration is already performed on an application in a subdomain, a C plane controller of the subdomain may perform incremental configuration in the subdomain based on the resource configuration of the application.

Figure 6:
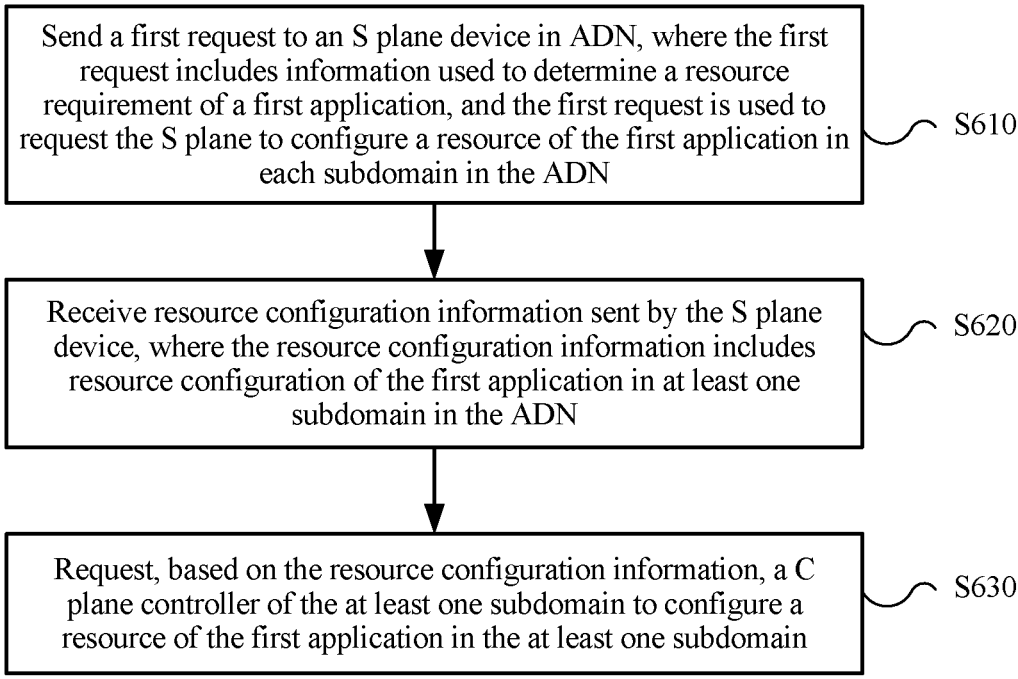
FIG. 6 is a flowchart of a resource configuration method of ADN according to another embodiment of this application.

FIG. 6 is a flowchart of a resource configuration method according to an embodiment of this application. The method in FIG. 6 is applied to a client in the ADN and is performed by the client. The ADN includes an S plane device, a C plane device, and a plane device. The D plane device is configured to transmit and forward data in the ADN, each C plane device is configured to control and manage at least one D plane device, the at least one D plane device controlled and managed by the C plane device forms one subdomain, and the S plane device is configured to monitor and configure a resource of an application in each subdomain in the ADN. It should be understood that the client of this application may be a mobile terminal in which the application is located, or a third-party device that monitors an application behavior and that is independent of the mobile terminal in which the application is located. The method in FIG. 6 may include the following steps.

S610. Send a first request to the S plane device in the ADN, where the first request includes information used to determine a resource requirement of the first application, and the first request is used to request the S plane to configure a resource of the first application in each subdomain in the ADN.

S620. Receive resource configuration information sent by the S plane device, where the resource configuration information includes resource configuration of the first application in at least one subdomain in the ADN.

S630. Request, based on the resource configuration information, a C plane controller of the at least one subdomain to configure a resource of the first application in the at least one subdomain.

In this application, the client requests, from the S plane device, the resource configuration of the first application in the subdomain in the ADN, and requests the C plane device of each subdomain to perform network resource configuration on the first application, so that the ADN can provide a differentiated service for the application based on the resource requirement of the application, meet various requirements of each application for the network, improve application efficiency, and facilitate application usage, thereby improving user experience.

Optionally, specific implementation of step S630 is sending, by using the D plane device in the ADN, a VP corresponding to a first subdomain, where the VP corresponding to the first subdomain is used by a C plane controller of the first subdomain to configure a resource of the first application in the first subdomain, the VP packet can be forwarded to the C plane controller of the first subdomain when a D plane device of the first subdomain receives the VP, and the first subdomain is any subdomain in the at least one subdomain.

Specifically, for a data format of the VP corresponding to the first subdomain, refer to the related description of the data format of the VP in the embodiment shown in FIG. 1, and the data format shown in Table 1 and FIG. 3. Details are not described in this application again.

For specific implementation of this application, refer to the methods performed by the client 1, the client 2, the client 3, and the like in the embodiments shown in FIG. 3 to FIG. 5. Details are not described in this application again.

Figure 7:
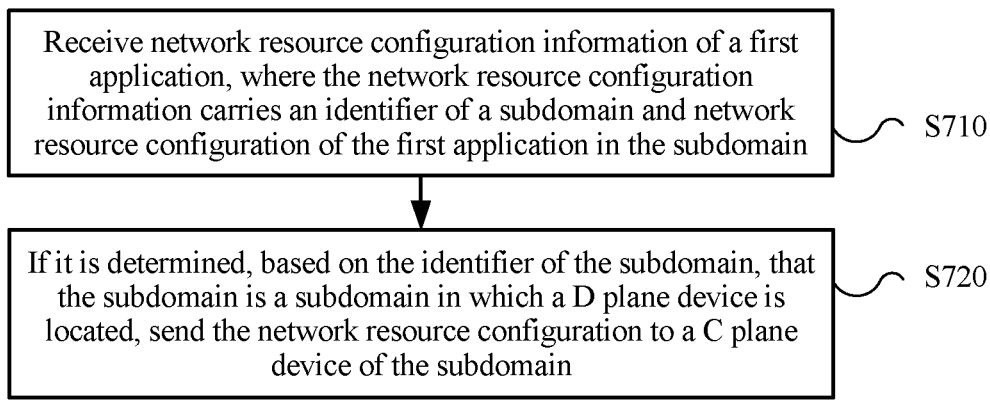
FIG. 7 is a flowchart of a resource configuration method of ADN according to still another embodiment of this application.

FIG. 7 is a flowchart of a resource configuration method of ADN according to an embodiment of this application. The method in FIG. 7 is applied to a D plane device in the ADN. The ADN includes an S plane device, a C plane device, and the D plane device, the D plane device is configured to transmit and forward data in the ADN, each C plane device is configured to control and manage at least one D plane device, the at least one D plane device controlled and managed by the C plane device forms one subdomain, and the S plane device is configured to monitor and configure a resource of an application in each subdomain in the ADN. It should be understood that, in this application, the plane device may be a network device, and is configured to perform data transmission and forwarding, and the like. The method in FIG. 7 may include the following steps.

S710. Receive resource configuration information of a first application, where the resource configuration information carries an identifier of a subdomain and resource configuration of the first application in the subdomain.

S720. If it is determined, based on the identifier of the subdomain, that the subdomain is a subdomain in which the D plane device is located, send the resource configuration to a C plane device of the subdomain, where the C plane controller is configured to control and manage a resource of each application in a subdomain to which the C plane controller belongs.

In this application, the D plane device sends the resource configuration of the first application in the subdomain to the C plane device of the subdomain, so that the C plane device performs resource configuration on the first application in the subdomain. In this way, the ADN can provide a differentiated service for the application based on a resource requirement of the application, meet various requirements of each application for the network, improve application efficiency, and facilitate application usage, thereby improving user experience.

Optionally, the method further includes: if it is determined, based on the identifier of the subdomain, that the subdomain is not the subdomain in which the D plane device is located, forwarding the resource configuration information of the first application.

Optionally, the resource configuration information is a VP. Specifically, for a data format of the VP, refer to the related description of the data format of the VP in the embodiment shown in FIG. 1, and the data format shown in Table 1 and FIG. 3. Details are not described in this application again.

For specific implementation of this application, refer to the methods performed by the D plane device 1, the D plane device 2, the D plane device 3, and the like in the embodiments shown in FIG. 3 to FIG. 5. Details are not described in this application again.

Figure 8:
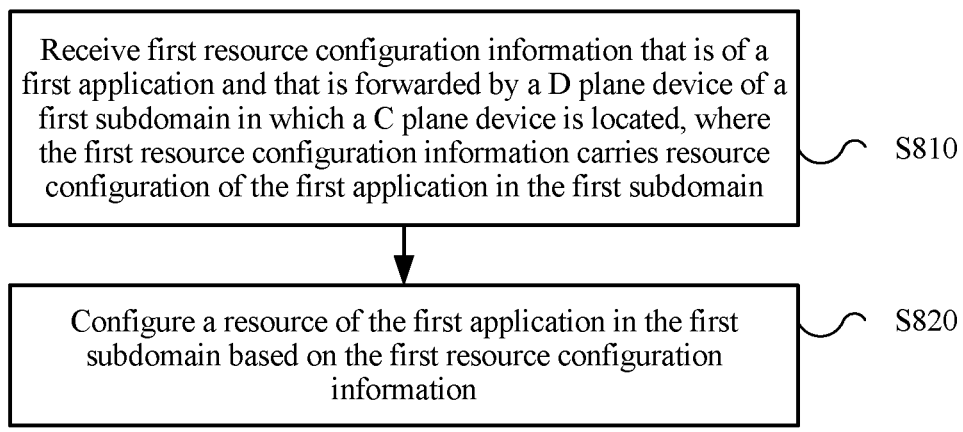
FIG. 8 is a flowchart of a resource configuration method of ADN according to still another embodiment of this application.

FIG. 8 is a flowchart of a resource configuration method of ADN according to an embodiment of this application. The method in FIG. 8 is applied to a C plane device in the ADN and is performed by C plane device. The ADN includes an S plane device, the C plane device, and a D plane device. The D plane device is configured to transmit and forward data in the ADN, each C plane device is configured to control and manage at least one D plane device, the at least one D plane device controlled and managed by the C plane device forms one subdomain, and the S plane device is configured to monitor and configure a resource of an application in each subdomain in the ADN. It should be understood that, in this application, the C plane device may be a network controller, configured to: control resource configuration in a subdomain, and report, to the S plane device, resource utilization information of the subdomain to which the C plane device belongs. The method in FIG. 8 may include the following steps.

S810. Receive first resource configuration information that is of a first application and that is forwarded by a D plane device of a first subdomain in which the C plane device is located, where the first resource configuration information carries resource configuration of the first application in the first subdomain.

S820. Configure a resource of the first application in the first subdomain based on the first resource configuration information.

In this application, the C plane device performs resource configuration on the first application in the subdomain based on the resource configuration that is of the first application in the subdomain and that is forwarded by the D plane device, so that the ADN can provide a differentiated service for the application based on a resource requirement of the application, meet various requirements of each application for the network, improve application efficiency, and facilitate application usage, thereby improving user experience.

Optionally, the method may further include: obtaining resource utilization information of each D plane device in the first subdomain, where the resource utilization information of each D plane device includes resource utilization information of an application; and sending resource utilization information of each application in the first subdomain to the S plane device of the ADN.

Optionally, the method further includes: obtaining resource configuration of an application of a second subdomain to which a second C plane device belongs; and specific implementation of step S820 is determining communication paths of the first application in the first subdomain and the second subdomain based on the resource configuration of the first application in the first subdomain and resource configuration of the first application in the second subdomain, and configuring the resource of the first application in the first subdomain based on the communication paths of the first application in the first subdomain and the second subdomain.

For example, the C plane device and the second C plane device may obtain, in a manner of message exchange, the resource configuration of the application of the second subdomain to which the second C plane device belongs.

Optionally, the method further includes: receiving second resource configuration information that is of the first application and that is forwarded by the D plane device of the first subdomain in which the C plane device is located, where the second resource configuration information carries the resource configuration of the first application in the first subdomain; and performing incremental configuration on the resource of the first application in the first subdomain based on the second resource configuration information.

Optionally, the first resource configuration information is a vertical packet VP. Specifically, for a data format of the VP, refer to the related description of the data format of the VP in the embodiment shown in FIG. 1, and the data format shown in Table 1 and FIG. 3. Details are not described in this application again.

For specific implementation of this application, refer to the methods performed by the C plane device 1, the C plane device 2, and the like in the embodiments shown in FIG. 3 to FIG. 5. Details are not described in this application again.

This application further proposes an S plane device, configured to: perform the method in the embodiment shown in FIG. 1, and implement functions of the S plane device in the embodiment shown in FIG. 1 and an extended embodiment thereof.

Specifically, the S plane device may implement a corresponding method by using a function module. The S plane device may include units configured to perform the method in the embodiment shown in FIG. 1.

This application further proposes a client, configured to: perform the method in the embodiment shown in FIG. 6, and implement functions of the client in the embodiment shown in FIG. 6 and an extended embodiment thereof.

Specifically, the client may implement a corresponding method by using a function module. The client may include units configured to perform the method in the embodiment shown in FIG. 6.

This application further proposes a D plane device, configured to: perform the method in the embodiment shown in FIG. 7, and implement functions of the D plane device in the embodiment shown in FIG. 7 and an extended embodiment thereof.

Specifically, the D plane device may implement a corresponding method by using a function module. The D plane device may include units configured to perform the method in the embodiment shown in FIG. 7.

This application further proposes a C plane device, configured to: perform the method in the embodiment shown in FIG. 8, and implement functions of the C plane device in the embodiment shown in FIG. 8 and an extended embodiment thereof.

Specifically, the C plane device may implement a corresponding method by using a function module. The C plane device may include units configured to perform the method in the embodiment shown in FIG. 8.

This application further proposes a computer readable storage medium, configured to store a computer program, and the computer program includes an instruction used to perform the method in the embodiment shown in FIG. 1.

This application further proposes another computer readable storage medium, configured to store a computer program, and the computer program includes an instruction used to perform the method in the embodiment shown in FIG. 6.

This application further proposes still another computer readable storage medium, configured to store a computer program, and the computer program includes an instruction used to perform the method in the embodiment shown in FIG. 7.

This application further proposes still another computer readable storage medium, configured to store a computer program, and the computer program includes an instruction used to perform the method in the embodiment shown in FIG. 8.

Figure 9:
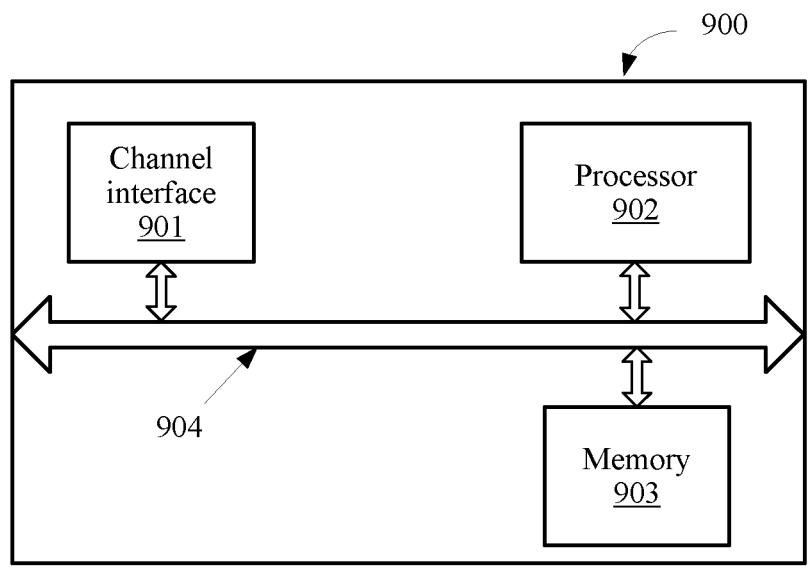
FIG. 9 is a schematic structural diagram of an S plane device according to this application.

This application further proposes an S plane device 900. FIG. 9 is a schematic structural diagram of the S plane device 900 according to this application. It should be understood that the S plane device 900 may be used in ADN. The ADN includes an S plane device, a C plane device, and a D plane device. The D plane device is configured to transmit and forward data in the ADN, each C plane device is configured to control and manage at least one D plane device, the at least one D plane device controlled and managed by the C plane device forms one subdomain, and the S plane device is configured to monitor and configure a resource of an application in each subdomain in the ADN. A schematic structural diagram of a physical apparatus of the S plane device 900 may be shown in FIG. 9, and includes a processor 902, a memory 903, and a channel interface 901.

The channel interface 901, the processor 902, and the memory 903 are connected to each other by using a bus 904. The bus 904 may be an ISA bus, a PCI bus, an EISA bus, or the like. The bus may be categorized as an address bus, a data bus, a control bus, or the like. For ease of indication, the bus is indicated by using only one double-headed arrow in FIG. 9. However, it does not mean that there is only one bus or only one type of bus.

The memory 903 is configured to store a program. Specifically, the program may include program code. The program code includes a computer operation instruction. The memory 903 may include a read-only memory and a random access memory, and provides an instruction and data for the processor 902. The memory 903 may include a high-speed RAM memory, and may further include a non-volatile for example, at least one disk memory.

The processor 902 is configured to execute the program stored in the memory 903.

Specifically, in the S plane device 900, the processor 902 may perform the following method by using the channel interface 901:

determining resource configuration information of a first application based on a first request sent by a client and global resource information of the ADN, where the first request includes information used to determine a resource requirement of the first application, the resource configuration information of the first application includes resource configuration of the first application in at least one subdomain in the ADN, and the global resource information includes resource utilization information of the first application in each subdomain and available resource information in each subdomain; and sending the resource configuration information of the first application to the client, where the resource configuration information of the first application is used by the client to request a C plane controller of the at least one subdomain to configure a resource of the first application in a subdomain to which the C plane controller belongs.

The foregoing method that is performed by the S plane device and that is disclosed in any one of the embodiments in FIG. 1, and FIG. 3 to FIG. 5 of this application may be applied to the processor 902, or may be implemented by the processor 902. The processor 902 may be an integrated circuit chip and has a signal processing capability. In an implementation process, each step of the foregoing method may be completed by using an integrated logical circuit of hardware in the processor 902 or an instruction in a form of software. The foregoing processor 902 may be a general purpose processor, including a central processing unit (CPU), a network processor (NP), and the like, or may be a digital signal processor (DSP), an application-specific integrated circuit (ARC), a field programmable gate array (FPGA), another programmable logic device, a discrete gate, a transistor logic device, or a discrete hardware component. The processor 902 may implement or perform the methods, the steps, and logical block diagrams that are disclosed in this application. The general purpose processor may be a microprocessor or the processor may be any conventional processor, or the like. Steps of the methods disclosed in this application may be directly performed and completed by using a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 903, and the processor 902 reads information in the memory 903 and implements the steps of the foregoing method in combination with hardware of the processor 920.

Figure 10:
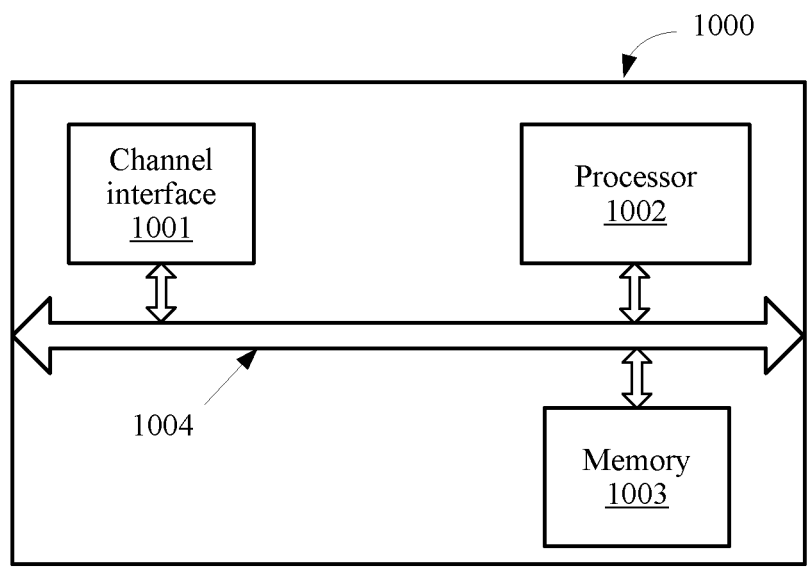
FIG. 10 is a schematic structural diagram of a client according to this application.

This application further proposes a client 1000. FIG. 10 is a schematic structural diagram of the client 1000 according to this application. It should be understood that the client 1000 may be used in ADN. The ADN includes an S plane device, a C plane device, and a D plane device. The D plane device is configured to transmit and forward data in the ADN, each C plane device is configured to control and manage at least one D plane device, the at least one D plane device controlled and managed by the C plane device forms one subdomain, and the S plane device is configured to monitor and configure a resource of an application in each subdomain in the ADN. A schematic structural diagram of a physical apparatus of the client 1000 may be shown in FIG. 10, and includes a processor 1002, a memory 1003, and a channel interface 1001.

The channel interface 1001, the processor 1002, and the memory 1003 are connected to each other by using a bus 1004. The bus 1004 may be an ISA bus, a PCI bus, an EISA bus, or the like. The bus may be categorized as an address bus, a data bus, a control bus, or the like. For ease of indication, the bus is indicated by using only one double-headed arrow in FIG. 10. However, it does not mean that there is only one bus or only one type of bus.

The memory 1003 is configured to store a program. Specifically, the program may include program code. The program code includes a computer operation instruction. The memory 1003 may include a read-only memory and a random access memory, and provides an instruction and data for the processor 1002. The memory 1003 may include a high-speed RAM memory, and may further include a non-volatile memory, for example, at least one disk memory.

The processor 1002 is configured to execute the program stored in the memory 1003.

Specifically, in the client 1000, the processor 1002 may perform the following method by using the channel interface 1001:

sending a first request to the S plane device in the ADN, where the first request includes information used to determine a resource requirement of the first application, and the first request is used to request the S plane to configure a resource of the first application in each subdomain in the ADN;

receiving resource configuration information sent by the S plane device, where the resource configuration information includes resource configuration of the first application in at least one subdomain in the ADN; and requesting, based on the resource configuration information, a C plane controller of the at least one subdomain to configure a resource of the first application in the at least one subdomain.

The foregoing method that is performed by the client, the client 1, the client 2, or the client 3 and that is disclosed in any one of the embodiments in FIG. 3 to FIG. 6 of this application may be applied to the processor 1002, or may be implemented by the processor 1002. The processor 1002 may be an integrated circuit chip and has a signal processing capability. In an implementation process, each step of the foregoing method may be completed by using an integrated logical circuit of hardware in the processor 1002 or an instruction in a form of software. The foregoing processor 1002 may be a general purpose processor, including a central processing unit (CPU), a network processor (NP), and the like, or may be a digital signal processor (DSP), an application-specific integrated circuit (ASIC), a field programmable gate array (FPGA), another programmable logic device, a discrete gate, a transistor logic device, or a discrete hardware component. The processor 1002 may implement or perform the methods, the steps, and logical block diagrams that are disclosed in this application. The general purpose processor may be a microprocessor or the processor may be any conventional processor, or the like. Steps of the methods disclosed in this application may be directly performed and completed by using a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1003, and the processor 1002 reads information in the memory 1003 and implements the steps of the foregoing method in combination with hardware of the processor 1002.

Figure 11:
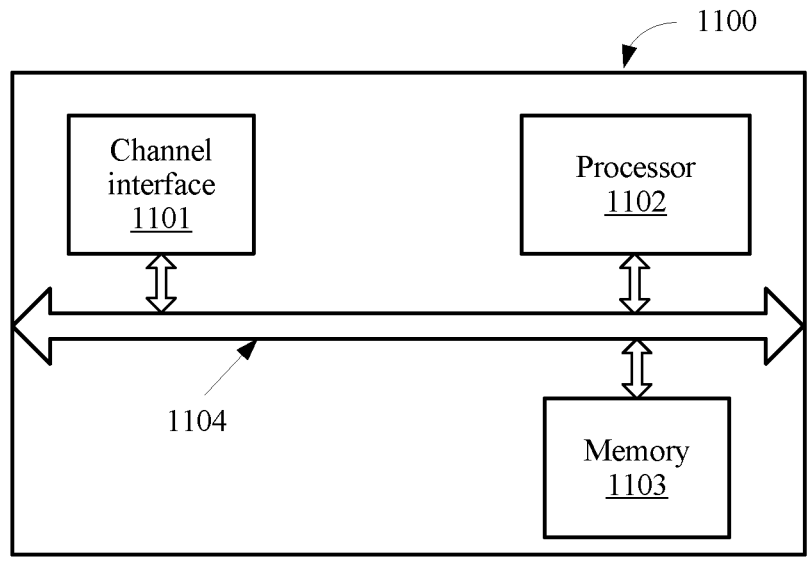
FIG. 11 is a schematic structural diagram of a D plane device according to this application.

This application further proposes a D plane device 1100. FIG. 11 is a schematic structural diagram of the D plane device 1100 according to this application. It should be understood that the D plane device 1100 may be used in ADN. The ADN includes an S plane device, a C plane device, and a D plane device. The D plane device is configured to transmit and forward data in the ADN, each C plane device is configured to control and manage at least one D plane device, the at least one D plane device controlled and managed by the C plane device forms one subdomain, and the S plane device is configured to monitor and configure a resource of an application in each subdomain in the ADN. A schematic structural diagram of a physical apparatus of the D plane device 1100 may be shown in FIG. 11, and includes a processor 1102, a memory 1103, and a channel interface 1101.

The channel interface 1101, the processor 1102, and the memory 1103 are connected to each other by using a bus 1104. The bus 1104 may be an ISA bus, a PCI bus, an EISA bus, or the like. The bus may be categorized as an address bus, a data bus, a control bus, or the like. For ease of indication, the bus is indicated by using only one double-headed arrow in FIG. 11. However, it does not mean that there is only one bus or only one type of bus.

The memory 1103 is configured to store a program. Specifically, the program may include program code. The program code includes a computer operation instruction. The memory 1103 may include a read-only memory and a random access memory, and provides an instruction and data for the processor 1102. The memory 1103 may include a high-speed RAM memory, and may further include a non-volatile memory, for example, at least one disk memory.

The processor 1102 is configured to execute the program stored in the memory 1103.

Specifically, in the D plane device 1100, the processor 1102 may perform the following method by using the channel interface 1101:

receiving resource configuration information of a first application, where the resource configuration information carries an identifier of a subdomain and resource configuration of the first application in the subdomain; and if it is determined, based on the identifier of the subdomain, that the subdomain is a subdomain in which the D plane device is located, sending the resource configuration to a C plane device of the subdomain, here the C plane controller is configured to control and manage a resource of each application in a subdomain to which the C plane controller belongs.

The foregoing method that is performed by the D plane device, the D plane device 1, the D plane device 2, or the like and that is disclosed in any one of the embodiments in FIG. 3 to FIG. 5, and FIG. 7 of this application may be applied to the processor 1102, or may be implemented by the processor 1102. The processor 1102 may be an integrated circuit chip and has a signal processing capability. In an implementation process, each step of the foregoing method may be completed by using an integrated logical circuit of hardware in the processor 1102 or an instruction in a form of software. The foregoing processor 1102 may be a general purpose processor, including a central processing unit (CPU), a network processor (NP), and the like, or may be a digital signal processor (DSP), an application-specific integrated circuit (ASIC), a field programmable gate array (FPGA), another programmable logic device, a discrete gate, a transistor logic device, or a discrete hardware component. The processor 1102 may implement or perform the methods, the steps, and logical block diagrams that are disclosed in this application. The general purpose processor may be a microprocessor or the processor may be any conventional processor, or the like. Steps of the methods disclosed in this application may be directly performed and completed by using a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1103, and the processor 1102 reads information in the memory 1103 and implements the steps of the foregoing method in combination with hardware of the processor 1102.

Figure 12:
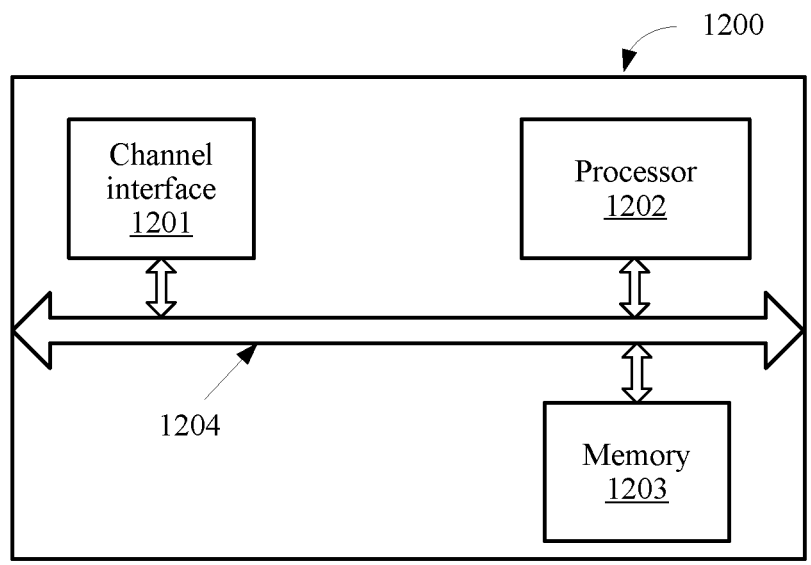
FIG. 12 is a schematic structural diagram of a C plane device according to this application.

This application further proposes a C plane device 1200. FIG. 12 is a schematic structural diagram of the C plane device 1200 according to this application. It should be understood that the C plane device 1200 may be used in ADN. The ADN includes an S plane device, a C plane device, and a D plane device. The D plane device is configured to transmit and forward data in the ADN each C plane device is configured to control and manage at least one D plane device, the at least one D plane device controlled and managed by the C plane device forms one subdomain, and the S plane device is configured to monitor and configure a resource of an application in each subdomain in the ADN. A schematic structural diagram of a physical apparatus of the C plane device 1200 may be shown in FIG. 12, and includes a processor 1202, a memory 1203, and a channel interface 1201.

The channel interface 1201, the processor 1202, and the memory 1203 are connected to each other by using a bus 1204. The bus 1204 may be an ISA bus, a PCI bus, an EISA bus, or the like. The bus may be categorized as an address bus, a data bus, a control bus, or the like. For ease of indication, the bus is indicated by using only one double-headed arrow in FIG. 12. However, it does not mean that there is only one bus or only one type of bus.

The memory 1203 is configured to store a program. Specifically, the program may include program code. The program code includes a computer operation instruction. The memory 1203 may include a read-only memory and a random access memory, and provides an instruction and data for the processor 1202. The memory 1203 may include a high-speed RAM memory, and may further include a non-volatile memory, for example, at least one disk memory.

The processor 1202 is configured to execute the program stored in the memory 1203.

Specifically, in the C plane device 1200, the processor 1202 may perform the following method by using the channel interface 1201:

receiving first resource configuration information that is of a first application and that is forwarded by a D plane device of a first subdomain in which the C plane device 1200 is located, where the first resource configuration information carries resource configuration of the first application in the first subdomain; and configuring a resource of the first application in the first subdomain based on the first resource configuration information.

The foregoing method that is performed by the C plane device, the C plane device 1, or the C plane device 2, or the like and that is disclosed in any one of the embodiments in FIG. 3 to FIG. 5, and FIG. 8 of this application may be applied to the processor 1202, or may be implemented by the processor 1202. The processor 1202 may be an integrated circuit chip and has a signal processing capability. In an implementation process, each step of the foregoing method may be completed by using an integrated logical circuit of hardware in the processor 1202 or an instruction in a form of software. The processor 1202 may be a general purpose processor, including a central processing unit (CPU), a network processor (NP), and the like, or may be a digital signal processor (DSP), an application-specific integrated circuit (ASIC), a field programmable gate array (FPGA), another programmable logic device, a discrete gate, a transistor logic device, or a discrete hardware component. The processor 1202 may implement or perform the methods, the steps, and logical block diagrams that are disclosed in this application. The general purpose processor may be a microprocessor or the processor may be any conventional processor, or the like. Steps of the methods disclosed in this application may be directly performed and completed by using a hardware decoding processor, or may be performed and completed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1203, and the processor 1202 reads information in the memory 1203 and implements the steps of the foregoing method in combination with hardware of the processor 1202.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A resource allocation method, wherein the method is applied to an S plane device in Application Driven Networking (ADN), the ADN comprises the S plane device, a C plane device, and a D plane device, wherein the D plane device is configured to transmit and forward data in the ADN, the C plane device is configured to control and manage the D plane device, the D plane device controlled and managed by the C plane device forms a subdomain, the S plane device is configured to monitor and configure a resource of an application in each subdomain in the ADN, and wherein the method comprising:

determining resource configuration information of a first application based on a first request sent by a client and global resource information of the ADN, wherein the first request comprises information for determining a resource requirement of the first application, the resource configuration information of the first application comprising resource configuration of the first application in at least one subdomain in the ADN, and the global resource information comprising resource utilization information of the first application in each subdomain of the ADN and available resource information in each subdomain of the ADN; and sending the resource configuration information of the first application to the client for requesting a C plane controller of the at least one subdomain to configure a resource of the first application in a subdomain to which the C plane controller belongs; and, wherein sending the resource configuration information of the first application to the client comprises:
sending, to the client, a vertical packet (VP) corresponding to each subdomain of the at least one subdomain, wherein each VP carries resource configuration of the first application in a subdomain corresponding to the VP, wherein the VP comprises:
an ADN identifier for representing an identifier of the first application in the ADN;
a subdomain identifier for representing an identifier of a subdomain for which the VP needs to be configured;
a serial number for distinguishing between a plurality of times of different resource requirements of a same application; and
resource category information for representing at least one resource category of the first application in the VP and a resource value corresponding to the at least one resource category.

2. The method according to claim 1, further comprising:
receiving resource utilization information sent by a C plane device of each subdomain of the ADN, wherein resource utilization information sent by a C plane device of a first subdomain represents resource utilization information of each application in the first subdomain; and
obtaining the global resource information of the ADN based on the resource utilization information sent by the C plane device of each subdomain of the ADN.

3. The method according to claim 1, wherein the first request comprises at least one of the following:
a quality of service (QoS) requirement of the first application;
a history traffic feature of the first application; or
an application behavior feature of the first application.

4. The method according to claim 1, wherein:
a field within the VP for storing the resource category information has a variable length.

5. The method according to claim 4, wherein the VP comprises one or more fields for storing the resource category information of the VP.

6. The method according to claim 1, wherein:
the VP further comprises a version number for representing a version of a packet format used by the VP.

7. The method according to claim 1, wherein the client is a device configured to:
measure a behavior of the first application; or
run the first application.

8. A resource allocation method, wherein the method is applied to a client in an Application Driven Networking (ADN), the ADN comprising an S plane device, a C plane device, and a D plane device, the D plane device being configured to transmit and forward data in the ADN, the C plane device being configured to control and manage the D plane device, the D plane device controlled and managed by the C plane device forming one subdomain, and the S plane device being configured to monitor and configure a resource of an application in each subdomain in the ADN, and wherein the method comprising:
sending a first request to the S plane device in the ADN, wherein the first request comprises information for determining a resource requirement of a first application and for requesting the S plane device to configure a resource of the first application in each subdomain in the ADN;
receiving resource configuration information sent by the S plane device, wherein the resource configuration information comprises resource configuration of the first application in at least one subdomain in the ADN, and is determined based on global resource information comprising resource utilization information of the first application in each subdomain of the ADN and available resource information in each subdomain of the ADN;
requesting, based on the resource configuration information, a C plane controller of the at least one subdomain to configure a resource of the first application in the at least one subdomain; and
receiving a vertical packet (VP) corresponding to each subdomain of the at least one subdomain, wherein each VP carries resource configuration of the first application in a subdomain corresponding to the VP, wherein the VP comprises:
an ADN identifier for representing an identifier of the first application in the ADN;
a subdomain identifier for representing an identifier of a subdomain for which the VP needs to be configured;
a serial number for distinguishing between a plurality of times of different resource requirements of a same application; and
resource category information for representing at least one resource category of the first application in the VP and a resource value corresponding to the at least one resource category.

9. The method according to claim 8, wherein requesting, based on the resource configuration information, a C plane controller of the at least one subdomain to configure a resource of the first application in the at least one subdomain comprises:
sending, by using the D plane device in the ADN, a vertical packet (VP) corresponding to a first subdomain, wherein the VP corresponding to the first subdomain is used by a C plane controller of the first subdomain to configure a resource of the first application in the first subdomain, the VP packet can be forwarded to the C plane controller of the first subdomain when a D plane device of the first subdomain receives the VP, and the first subdomain is any subdomain in the at least one subdomain.

* * * * *